US010312816B1

(12) United States Patent
Zhao et al.

(10) Patent No.: US 10,312,816 B1
(45) Date of Patent: Jun. 4, 2019

(54) PRIMARY CONTROLLER OF SWITCHING POWER SUPPLY AND SWITCHING POWER SUPPLY

(71) Applicant: SUZHOU POWERON IC DESIGN CO., LTD., Suzhou, Jiangsu (CN)

(72) Inventors: Changshen Zhao, Jiangsu (CN); Haisong Li, Jiangsu (CN); Wenliang Liu, Jiangsu (CN); Yangbo Yi, Jiangsu (CN)

(73) Assignee: SUZHOU POWERON IC DESIGN CO., LTD., Suzhou (CN)

( * ) Notice: Subject to any disclaimer, the term of this patent is extended or adjusted under 35 U.S.C. 154(b) by 0 days.

(21) Appl. No.: 16/000,812

(22) Filed: Jun. 5, 2018

(30) Foreign Application Priority Data

Mar. 14, 2018 (CN) .......................... 2018 1 0208257

(51) Int. Cl.
*H02M 3/335* (2006.01)
*H02M 3/156* (2006.01)
*H02M 3/155* (2006.01)

(52) U.S. Cl.
CPC ....... *H02M 3/33507* (2013.01); *H02M 3/156* (2013.01); *H02M 2003/1557* (2013.01)

(58) Field of Classification Search
CPC .... H02M 3/335; H02M 3/33507; H02M 3/28; H02M 2001/008; H02M 1/08
USPC .... 363/21.08, 21.12–21.15, 21.18, 56.01, 59
See application file for complete search history.

(56) References Cited

U.S. PATENT DOCUMENTS

| 5,818,257 | A | * | 10/1998 | Villa | ................ | H03K 3/356113 326/81 |
| 6,014,039 | A | * | 1/2000 | Kothandaraman | .......................... | H03K 19/00315 326/83 |
| 7,505,287 | B1 | * | 3/2009 | Kesterson | ......... | H02M 3/33507 363/21.01 |
| 8,125,798 | B2 | * | 2/2012 | Huynh | ................... | H02M 3/335 363/147 |
| 8,570,772 | B2 | * | 10/2013 | Morris | .................... | H02M 1/32 363/21.14 |
| 9,362,737 | B2 | * | 6/2016 | Yang | ....................... | H02M 1/32 |

* cited by examiner

*Primary Examiner* — Rajnikant B Patel
(74) *Attorney, Agent, or Firm* — Fenwick & West LLP

(57) ABSTRACT

A primary controller of a switching power supply and the switching power supply are provided. The primary controller includes an input voltage detection module which receives a detected signal and generates a detection signal; a controller module which receives a feedback signal and a current sampling signal of the switching power supply, and generates a control signal according to the feedback signal and the current sampling signal; a PWM signal generation module, receive the detection signal and the control signal, generate a PWM signal according to the control signal when the detection signal is the second level, and stop generating the PWM signal when the detection signal is the first level; and a power switch transistor, having a control terminal coupled with an output terminal of the PWM signal generation module.

10 Claims, 12 Drawing Sheets

PRIMARY CONTROLLER OF SWITCHING POWER SUPPLY AND SWITCHING POWER SUPPLY

CROSS-REFERENCE TO RELATED APPLICATIONS

This application claims the benefit of priority to Chinese Patent Application No. 201810208257.4, titled "PRIMARY CONTROLLER OF SWITCHING POWER SUPPLY AND SWITCHING POWER SUPPLY," filed on Mar. 14, 2018, the entire disclosure of which is incorporated herein by reference

TECHNICAL FIELD

The disclosure generally relates to a switching power supply technology field, and more particularly, to a primary controller of a switching power supply and a switching power supply.

BACKGROUND

With the popularity of portable electronic devices, the switching power supply becomes a main power solution for various electronic devices.

Referring to FIG. 1, in a conventional technology, a conventional switching power supply 10 mainly includes: a primary winding module 101, a primary controller 102, and a primary current sampling loop 103 coupled with a current sampling port CS of the primary controller 102, a DC (direct current) power output stage circuit 104 coupled with a secondary side of a transformer T1 and a power supply & voltage feedback loop 105 of a power supply terminal VDD of the primary controller 102 coupled with an auxiliary winding Na of the transformer T1. The primary winding module 101 receives an input signal VIN of the switching power supply 10, and one terminal of an input capacitor Cin receives the input signal VIN and the other terminal is grounded. The primary winding module 101 includes a clamping circuit 1011, and a primary winding Np of the transformer T1 coupled with the clamping circuit 1011. The primary controller 102 includes a PWM (Pulse Width Modulation) module 1021 (the PMW shown in FIG. 1), a controller 1022 coupled with the PWM module 1021 and a power switch transistor M1. The primary current sampling loop 103 includes a resistor R5. The DC output stage circuit 104 includes a secondary winding Ns of the transformer T1, a diode D2 coupled with a dotted terminal of the secondary winding Ns, an output capacitor Cout, a load 1041 and a resistor Rout. The power supply and voltage feedback loop 105 includes the auxiliary winding Na, and the auxiliary winding Na has a dotted terminal coupled with a feedback voltage division resistor R4 and a positive pole of a diode D1. The power supply a voltage feedback loop 105 further includes a feedback voltage division resistor R7, a starting resistor R6 and a capacitor Cvdd. The starting resistor R6 receives the input signal VIN of the switching power supply 10. A feedback terminal FB of the primary controller 102 is coupled with the feedback voltage division resistor R4 and the feedback voltage division resistor R7.

In the conventional switch power supply 10, when a voltage of the input signal VIN of the switching power supply 10 is higher than a withstand voltage of the power switch transistor M1, there is a burning risk of the power switch transistor M1 when the power switch transistor M1 is conducted. When the voltage of the input signal VIN is lower than a rated voltage threshold of the normal operation, a driving capability of a circuit system is insufficient, and an output voltage ripple of the circuit system may not meet a standard specification, which may cause the load 1041 to fail to work properly.

SUMMARY

Embodiments of the present disclosure provide a switching power supply capable of overcoming some insufficiency of the conventional switching power supply, such as an overvoltage burning of the power switch transistor, or a non-standard output ripple of undervoltage output.

A primary controller of the switching power supply is provided in embodiments of the present disclosure, the primary controller of the switching power supply includes: an input voltage detection module, having an input terminal input with a detected signal, wherein the input voltage detection module is configured to detect a voltage of the detected signal and generate a detection signal, and the detection signal is a first level when a voltage of the detected signal is higher than a first high voltage threshold and duration exceeds a first predetermined time period, or when the voltage of the detected signal is lower than a first low voltage threshold and duration exceeds a second predetermined time period, otherwise, the detection signal is a second level, wherein the detected signal is obtained according to an input signal of the switching power supply, and the first low voltage threshold is lower than the first high voltage threshold, and the second level is different from the first level; a controller module, configured to receive a feedback signal and a current sampling signal of the switching power supply, and generate a control signal according to the feedback signal and the current sampling signal; a Pulse Width Modulation (PWM) signal generation module, configured to receive the detection signal and the control signal, generate a PWM signal according to the control signal when the detection signal is the second level, and stop generating the PWM signal when the detection signal is the first level; and a power switch transistor, having a control terminal coupled with an output terminal of the PWM signal generation module.

In some embodiment, the input voltage detection module includes: a first voltage comparator, configured to compare the voltage of the detected signal with the first high voltage threshold; a first timing module, configured to start timing when the first voltage comparator detects that the voltage of the detected signal is higher than the first high voltage threshold; a second voltage comparator, configured to compare the voltage of the detected signal with the first low voltage threshold; a second timing module, configured to start timing when the second voltage comparator detects that the voltage of the detected signal is lower than the first low voltage threshold; and a logic circuit, configured to obtain the detection signal according to output signals of the first timing module and the second timing module.

In some embodiment, the first timing module includes: a first timer, having an input terminal coupled with an output terminal of the first voltage comparator, wherein an overvoltage control signal output from the first timer is the first level when a timing period of the first timer exceeds a third predetermined time period; a first latch, configured to receive and latch the overvoltage control signal in response to the overvoltage control signal being the first level; and a lightning strike timing filter, configured to start timing in response to an output signal of the first latch being the first level, wherein a surge control signal output from the lightning strike timing filter is the first level when a timing period of the lightning strike timing filter exceeds a fourth predetermined time period, wherein a sum of the third predetermined time period and the fourth predetermined time period is equal to the first predetermined time period.

In some embodiment, the lightning strike timing filter includes: a third timer, configured to start timing in response to the output signal of the first latch being the first level, wherein an output signal of the third timer is the first level when a timing period of the third timer exceeds the fourth predetermined time period; a second latch, coupled with an output terminal of the third timer, and configured to latch the output signal of the third timer in response to the output signal of the third timer being the first level, wherein an output terminal of the second latch outputs the surge control signal; and a fourth timer, coupled with the output terminal of the third timer, wherein the fourth timer starts timing when the output signal of the third timer is the first level, and the second latch is reset when a timing period of the fourth timer exceeds a fifth predetermined time period.

In some embodiment, the second timing module includes: a second timer, having an input terminal coupled with an output terminal of the second voltage comparator, and configured to start timing in response to an output signal of the second voltage comparator being the first level, wherein an undervoltage control signal output from the second timer is the first level when a timing period of the second timer exceeds the second predetermined time period.

In some embodiment, the input voltage detection module further includes: an overvoltage adjustment module, configured to charge the input terminal of the input voltage detection module when the voltage of the detected signal is higher than a second high voltage threshold; wherein the second high voltage threshold is lower than the first high voltage threshold and higher than the first low voltage threshold.

In some embodiment, the overvoltage adjustment module includes: a third voltage comparator, configured to compare the voltage of the detected signal with the second high voltage threshold; a sixth timer, coupled with an output terminal of the third voltage comparator, and configured to start timing in response to the voltage of the detected signal being higher than the second high voltage threshold, wherein when a timing period of the sixth timer exceeds a seventh predetermined time period, a current start signal is output; and a current source, configured to charge the input terminal of the input voltage detection module in response to the current start signal.

A switching power supply is provided in the embodiments of the present disclosure, and the switching power supply includes the primary controller above mentioned.

In some embodiment, the switching power supply further includes: a primary winding, having a non-dotted terminal input with the input signal of the switching power supply, and a dotted terminal coupled with an input terminal of the power switch transistor; an auxiliary winding, having a dotted terminal coupled with a positive pole of a diode, and a non-dotted terminal grounded, wherein a negative pole of the diode is coupled with a power supply terminal of the primary controller which receives the input signal of the switching power supply through a starting resistor; and a voltage division network, having an input terminal input with the input signal of the switching power supply and an output terminal outputting the detected signal.

In some embodiment, the switching power supply further includes: a primary winding, having a non-dotted terminal input with the input signal of the switching power supply, and a dotted terminal coupled with an input terminal of the power switch transistor; an auxiliary winding, having a dotted terminal coupled with a positive pole of a diode, and a non-dotted terminal ground, wherein a negative pole of the diode is coupled with a power supply terminal of the primary controller; a feedback voltage division resistor, having a terminal input with the input signal, and the other terminal coupled with an input terminal of the primary controller; wherein the primary controller receives the input signal, and the primary controller further includes: a first switch, having a first terminal coupled with the input terminal of the primary controller and a control terminal input with a power supply control signal, wherein a voltage of the power supply control signal increases as the input signal of the switching power supply increases; an impedance element, having a terminal coupled with a second terminal of the first switch and outputting the detected signal, and the other terminal grounded; and a second switch, having a first terminal coupled with the power supply terminal of the primary controller, a second terminal coupled with the input terminal of the primary controller and a control terminal input with an inverting signal of the power supply control signal.

Compared with a conventional technology, the present disclosure has following advantages.

A primary controller of the switching power supply is provided in embodiments of the present disclosure, the primary controller of the switching power supply includes: an input voltage detection module, having an input terminal input with a detected signal, wherein the input voltage detection module is configured to detect a voltage of the detected signal and generate a detection signal, and the detection signal is a first level when a voltage of the detected signal is higher than a first high voltage threshold and duration exceeds a first predetermined time period, or when the voltage of the detected signal is lower than a first low voltage threshold and duration exceeds a second predetermined time period, otherwise, the detection signal is a second level, wherein the detected signal is obtained according to an input signal of the switching power supply, and the first low voltage threshold is lower than the first high voltage threshold, and the second level is different from the first level; a controller module, configured to receive a feedback signal and a current sampling signal of the switching power supply, and generate a control signal according to the feedback signal and the current sampling signal; a Pulse Width Modulation (PWM) signal generation module, configured to receive the detection signal and the control signal, generate a PWM signal according to the control signal when the detection signal is the second level, and stop generating the PWM signal when the detection signal is the first level; and a power switch transistor, having a control terminal coupled with an output terminal of the PWM signal generation module. The primary controller provided in embodiments of the present disclosure may be used as a switching power supply of a portable electronic device, and detect whether an input voltage of an input signal of the switching power supply is a rated voltage suitable for normal operation. If the input voltage is at overvoltage or undervoltage, the primary controller may realize an overvoltage protection or an undervoltage protection of the input voltage, so that overvoltage burning of the power switch transistor and the non-standard output ripple of undervoltage output may be avoided.

Further, the first timing module includes: a first timer, having an input terminal coupled with an output terminal of the first voltage comparator, wherein an overvoltage control signal output from the first timer is the first level when a timing period of the first timer exceeds a third predetermined time period; a first latch, configured to receive and latch the overvoltage control signal in response to the overvoltage control signal being the first level; and a lightning strike timing filter, configured to start timing in response to an output signal of the first latch being the first level, wherein a surge control signal output from the lightning strike timing filter is the first level when a timing period of the lightning strike timing filter exceeds a fourth predetermined time period, wherein a sum of the third predetermined time period and the fourth predetermined time period is equal to the first predetermined time period. With the technical solution provided in embodiments of the present disclosure, even if the load circuit encounters a lightning strike during normal operation, the primary controller of the switching power supply does not determine a short-term high voltage caused by the lightning strike as an overvoltage of the input voltage, so that the load circuit can still work under the lightning strike.

Further, the switching power supply also includes: a primary winding, having a non-dotted terminal input with the input signal of the switching power supply, and a dotted terminal coupled with an input terminal of the power switch transistor; an auxiliary winding, having a dotted terminal coupled with a positive pole of a diode, and a non-dotted terminal grounded, wherein a negative pole of the diode is coupled with a power supply terminal of the primary controller which receives the input signal of the switching power supply through a starting resistor; and a voltage division network, having an input terminal input with the input signal of the switching power supply and an output terminal outputting the detected signal. With the technical solution provided in embodiments of the present disclosure, the voltage division network other than the primary controller may be adjusted to set the overvoltage threshold and the undervoltage threshold of the input voltage, which is beneficial for flexibly setting the rated working voltage for the load circuit.

Further, the switching power supply also includes: a primary winding, having a non-dotted terminal input with the input signal of the switching power supply, and a dotted terminal coupled with an input terminal of the power switch transistor; an auxiliary winding, having a dotted terminal coupled with a positive pole of a diode, and a non-dotted terminal ground, wherein a negative pole of the diode is coupled with a power supply terminal of the primary controller; a feedback voltage division resistor, having a terminal input with the input signal, and the other terminal coupled with an input terminal of the primary controller; wherein the primary controller receives the input signal, and the primary controller further includes: a first switch, having a first terminal coupled with the input terminal of the primary controller and a control terminal input with a power supply control signal, wherein a voltage of the power supply control signal increases as the input signal of the switching power supply increases; an impedance element, having a terminal coupled with a second terminal of the first switch and outputting the detected signal, and the other terminal grounded; and a second switch, having a first terminal coupled with the power supply terminal of the primary controller, a second terminal coupled with the input terminal of the primary controller and a control terminal input with an inverting signal of the power supply control signal. With the switching power supply provided in embodiments of the present disclosure, the voltage division resistor and the impedance element constitute the voltage division network, and the starting resistor of the switching power supply can reuse the voltage division resistor of the primary controller, so that a circuit structure of the switching power supply is simplified, and a size and cost of the switching power supply are reduced.

DETAILED DESCRIPTION

Those skills in the art may understand that, as described in the background, when the overvoltage occurs in a conventional switching power supply, a power switch transistor may be burned, and output voltage ripple may not meet the specification requirement when an undervoltage occurs.

A primary controller of the switching power supply is provided in embodiments of the present disclosure, the primary controller of the switching power supply includes: an input voltage detection module, having an input terminal input with a detected signal, wherein the input voltage detection module is configured to detect a voltage of the detected signal and generate a detection signal, and the detection signal is a first level in a period when a voltage of the detected signal is higher than a first high voltage threshold and duration of the period exceeds a first predetermined time period, or in a period when the voltage of the detected signal is lower than a first low voltage threshold and duration of the period exceeds a second predetermined time period, otherwise, the detection signal is a second level, wherein the detected signal is obtained according to an input signal of the switching power supply, and the first low voltage threshold is lower than the first high voltage threshold, and the second level is different from the first level; a controller module, configured to receive a feedback signal and a current sampling signal of the switching power supply, and generate a control signal according to the feedback signal and the current sampling signal; a Pulse Width Modulation (PWM) signal generation module, configured to receive the detection signal and the control signal, generate a PWM signal according to the control signal when the detection signal is the second level, and stop generating the PWM signal when the detection signal is the first level; and a power switch transistor, having a control terminal coupled with an output terminal of the PWM signal generation module. The primary controller provided in embodiments of the present disclosure may be used as a switching power supply of a portable electronic device, and detect whether an input voltage of an input signal of the switching power supply is a rated voltage suitable for normal operation. If the input voltage is at overvoltage or undervoltage, the primary controller may realize an overvoltage protection or an undervoltage protection of the input voltage, so that overvoltage burning of the power switch transistor and the non-standard output ripple of undervoltage output may be avoided.

The foregoing objects, features and advantages of the present disclosure will become more apparent from the following detailed description of specific embodiments of the disclosure taken in conjunction with the accompanying drawings.

Figure 2:
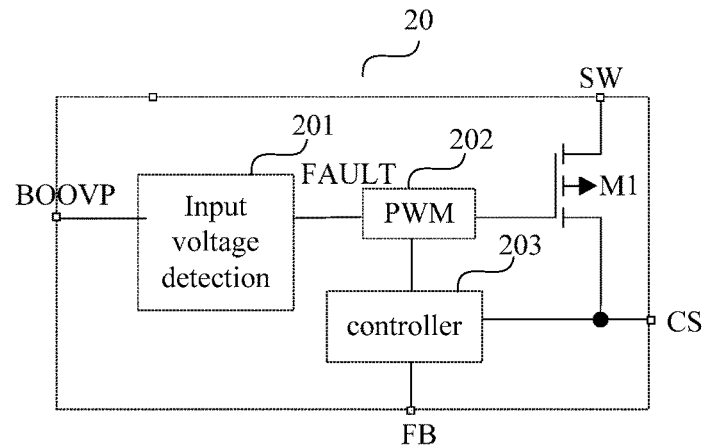
FIG. 2 schematically illustrates a structural diagram of a primary controller of a switching power supply according to an embodiment of the present disclosure.

FIG. 2 schematically illustrates a structural diagram of a primary controller of a switching power supply according to an embodiment of the present disclosure. Referring to FIG. 2, a primary controller 20 of the switching power supply (hereinafter referred as the primary controller 20) may include an input voltage detection module 201 (that is, "input voltage detection" shown in FIG. 2), a PWM signal generation module 202 (that is, "PWM" shown in FIG. 2), a controller module 203 (that is, "controller" in FIG. 2) and a power switch transistor M1.

Specifically, the input voltage detection module 201 has an input terminal (that is, an input port of a detected signal BOOVP shown in FIG. 2) input with a detected signal BOOVP, and the detected signal BOOVP is obtained from an input signal of an external switching power supply. For example, the detected signal BOOVP is obtained by dividing the voltage by a voltage division network in the switching power supply. After receiving the detected signal BOOVP, the input voltage detection module 201 may detect a voltage of the detected signal BOOVP to generate a detection signal. The detection signal is a first level (for example, the high level) when a voltage of the detected signal BOOVP is higher than a first high voltage threshold VH1 (not shown in FIG. 2) and duration exceeds a first predetermined time period T1 (not shown in FIG. 2), or the detection signal is the first level (for example, the high level) when the voltage of the detected signal BOOVP is lower than a first low voltage threshold VL1 and duration exceeds a second predetermined time period T2, otherwise, the detection signal is a second level (for example, a low level).

The first low voltage threshold VL1 may be lower than the first high voltage threshold VH1, and the second level is different from the first level. When the first level is the high level, the second level may be the low level. In some embodiment, when the voltage of the detected signal BOOVP is lower than the first low voltage threshold VL1 and duration exceeds the second predetermined time period T2, the switching power supply can determine that the input voltage of the switching power supply is lower than a minimum rated voltage, and the detection signal may be set to the high level to turn off the output of the switch power supply, that is, the PWM signal generation module 202 stops generating the PWM signal. Similarly, when the voltage of the detected signal BOOVP is higher than the first high voltage threshold VH1 and duration exceeds the first predetermined time period T1, the switching power supply can determine that the input voltage of the switching power supply is higher than a maximum rated voltage, and the detection signal may be set to the high level, so that the PWM signal generation module 202 stops generating the PWM signal.

In some embodiment, the first level may be the low level and the second level may be the high level. At this time, an operating principle of the switching power supply circuit is as described above, which is not repeated here again.

In the following, the disclosure uses that the first level is the high level and the second level is the low level as an example to explain in detail.

The PWM signal generation module 202 receives the detected signal BOOVP from an input voltage detection module 2010 and receives the control signal generated by the controller module 203. When the detection is the second level (hereafter, the low level represents the second level), the PWM signal generation module 202 generates a PWM signal according to the control signal. When the detection signal is the first level (hereafter, the high level represents the first level), the PWM signal generation module 202 stops generating a PWM signal according to the control signal.

The controller module 203 has a first input terminal coupled with a source of the power switch transistor M1, and a second input terminal input with a feedback signal (a signal output by a feedback terminal FB) in the switching power supply and a current sampling signal generated by a current sampling port CS, and generates the control signal according to the feedback signal and the current sampling signal.

A gate of the power switch transistor M1 is coupled with an output terminal of the PWM signal generation module 202. The output terminal of the input voltage detection module 201 is coupled with a first input terminal of the PWM signal generation module; a drain of the power switch transistor M1 is coupled with the power switch transistor M1 is coupled with a switch port SW of the primary controller 20.

Figure 3:
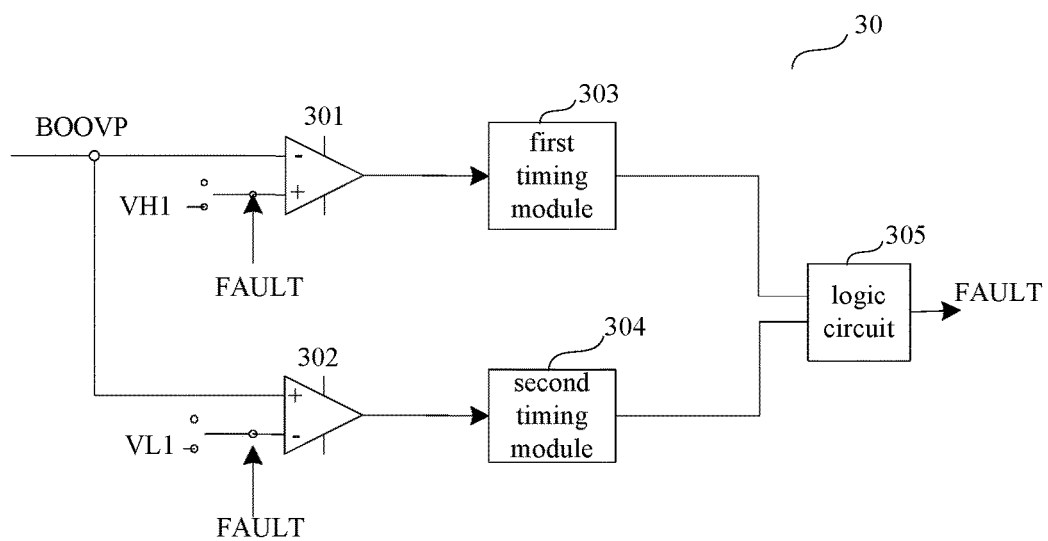
FIG. 3 schematically illustrates a structural diagram of an input voltage detection module in the primary controller shown in FIG. 2 according to an embodiment of the present disclosure.

In some embodiment, FIG. 3 illustrates a specific embodiment of an input voltage detection module 30 shown in FIG. 2. The input voltage detection module 30 shown in FIG. 3 may include a first voltage comparator 301, a second voltage comparator 302, a first timing module 303, a second timing module 304 and a logic circuit 305.

Specifically, a negative terminal of the first voltage comparator 301 receives the detected signal BOOVP signal, and when a detection signal FAULT signal is the low level (the switching power supply circuit works normally), the first voltage comparator 301 has a positive terminal receiving the first high voltage threshold VH1, and an output terminal coupled with the first timing module 303.

The positive terminal of the second voltage comparator 302 receives the detected signal BOOVP. When the detection signal FAULT is the high level (for example, the switching power supply is not powered), a negative terminal of the second voltage comparator 302 receives the first low voltage threshold VL1, and an output terminal is coupled with the second timing module 304.

The logic circuit 305 receives output signals of the first timing module 303 and the second timing module 304, and it can determine the detection signal FAULT is the high level or the low level according the output signals of the first timing module 303 and the second timing module 304.

Further, the first voltage comparator 301 may be configured to compare a voltage of the detected signal BOOVP and the first high voltage threshold VH1. When the first voltage comparator 301 detects the detected signal BOOVP is higher than the first high voltage threshold VH1, the first timing module 303 starts timing.

Similarly, the second voltage comparator 302 may be configured to compare the voltage of the detected signal BOOVP and the first low voltage threshold VL1. When the second comparator 302 detects the detected signal BOOVP is lower than the first low voltage threshold VL1, the second timing module 304 starts timing. The logic circuit 305 can determine the detection signal FAULT is the high level or the low level according the output signals of the first timing module 303 and the second timing module 304.

Figure 4:
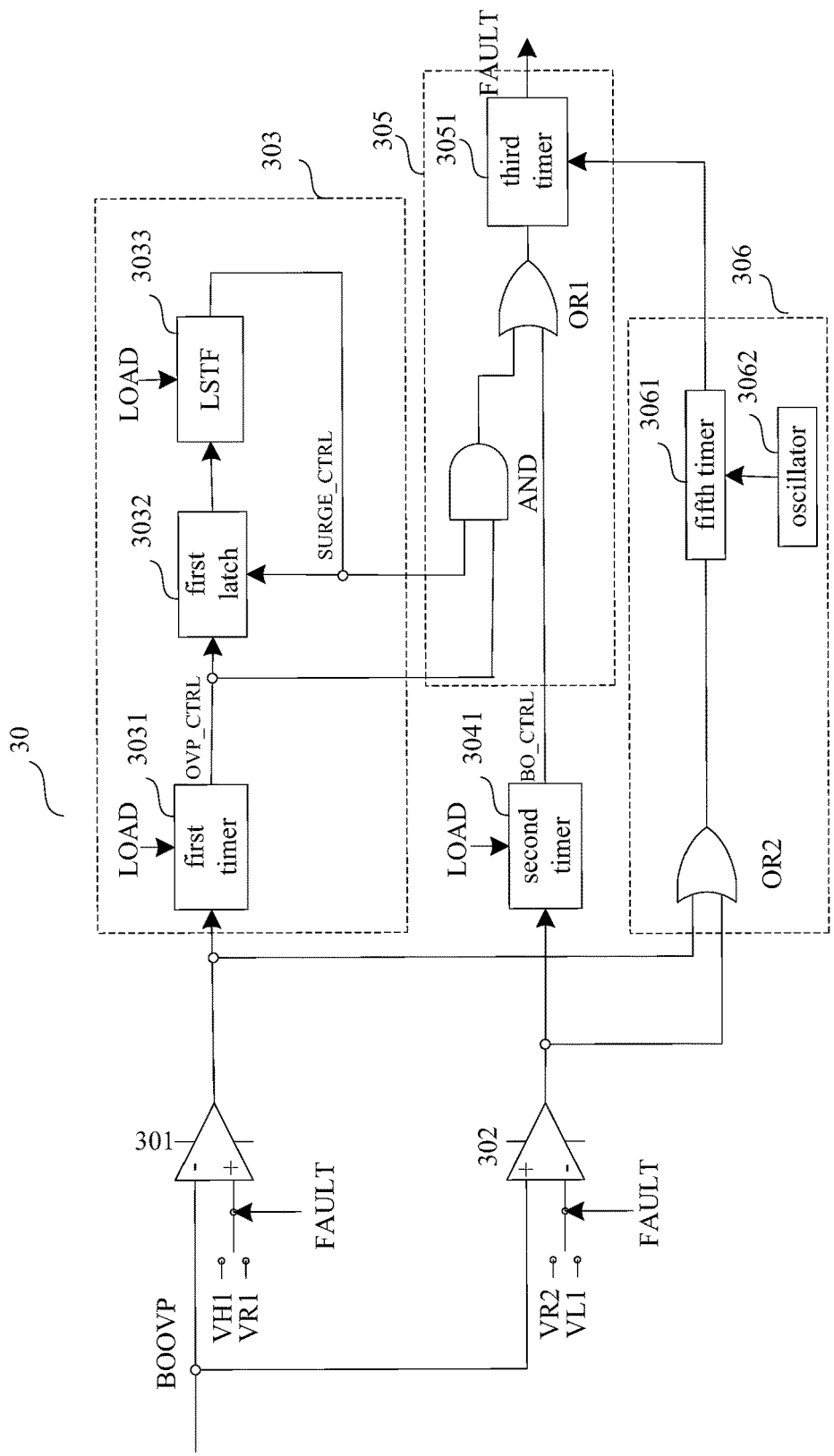
FIG. 4 schematically illustrates a structural diagram of an embodiment of the input voltage detection module shown in FIG. 3 according to an embodiment of the present disclosure.

In some embodiment, referring to FIG. 3 and FIG. 4, the first timing module 303 in the input voltage detection module 30 may include a first timer 3031, a first latch 3032 and a lightning strike timing filter (LSTF) 3033.

Specifically, an input terminal of the first timer 3031 is coupled with an output terminal of the first voltage comparator 301. When the first voltage comparator 301 outputs the low level, the first timer 3031 may receive an oscillation signal LOAD output from an external load circuit and start timing. When a timing period of the first timer exceeds a third predetermined time period T3, an overvoltage control signal OVP_CTRL output from the first timer 3031 is the high level; after receiving the overvoltage control signal OVP_CTRL (the high level), the first latch 3032 latches the overvoltage control signal OVP_CTRL. At this time, the output signal of the first latch 3032 is the high level.

In response to the high level signal output from the first latch 3032, the lightning strike timing filter 3033 starts timing. When a timing period of the lightning strike timing filter 3033 exceeds a fourth predetermined time period T4, a surge control signal SURGE_CTRL output from the lightning strike timing filter 3033 is the high level. A sum of the third predetermined time period T3 and the fourth predetermined time period T4 is equal to the first predetermined time period T1.

Referring to FIG. 4, the second timing module 304 (not shown) may include a second timer 3041. The second timer 3041 has a first input terminal coupled with an output terminal of the second voltage comparator 302, and a second input terminal input with an oscillation signal LOAD output from an external load circuit (not shown). When an output signal of the second voltage comparator is the low level, the second timer 3041 starts timing. When a timing period of the second timer 3041 exceeds the second predetermined time period T2, an undervoltage control signal BO CTRL output from the second timer 3041.

Referring to FIG. 4, the logic circuit 305 may include an AND gate AND, a first OR gate OR1, and a third latch 3051.

When the undervoltage control signal BO CTRL is the high level, an output signal of the first OR gate OR1 is the high level, and the third latch 3051 latches the high level and sets the outputting detection signal FAULT to the high level. When the detection signal FAULT is set to the high level, the PWM signal generation module 202 may stop generating the PWM signal.

Specifically, the AND gate AND has a first input terminal input with the surge control signal SURGE_CTRL, and a second input terminal input with the overvoltage control signal OVP_CTRL. When both are the high level, an output signal of the AND gate AND is the high level and an output signal of the first OR gate OR1 is the high level. At this time, the third latch 3051 may receive the high level signal from the first OR gate OR1. The third latch 3051 may latch the high level signal and set the output detection signal FAULR as the high level. When the detection signal FAULR is set to the high level, the PWM signal generation module 202 stops generating the PWM signal.

Figure 5:
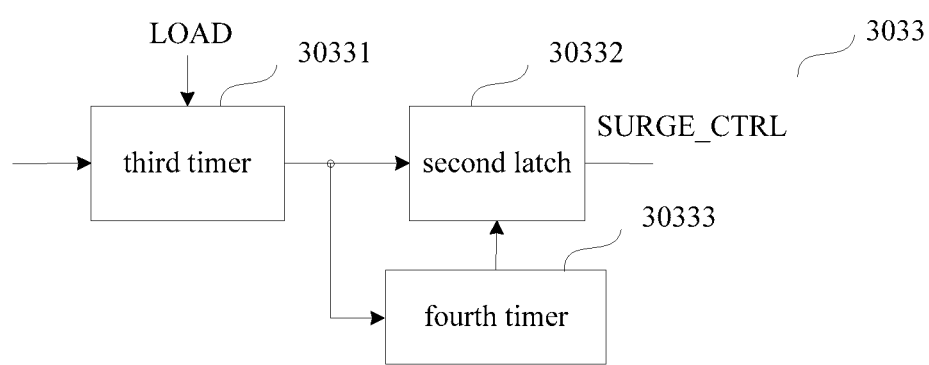
FIG. 5 schematically illustrates a structural diagram of a lightning strike timing filter in the input voltage detection module shown in FIG. 4 according to an embodiment of the present disclosure.

Referring to FIG. 5, in some embodiment, the lightning strike timing filter 3033 may include: a third timer 30331 and a second latch 30332. The third timer 30331 receives the overvoltage control signal OVP_CTRL from an output terminal of the first latch 3032 and receives the oscillation signal LOAD output from the external load circuit (not shown).

A first input terminal of the third timer 30331 is coupled with the output terminal of the first latch 3032, and the oscillation signal LOAD provides a clock signal to the third timer 30331. An output terminal of the third timer 30331 is coupled with a first input terminal of the second latch 30332; a second input terminal of the third timer 30331 receives the oscillation signal LOAD output from the external load circuit (not shown). After that, the output terminal of the second latch 30332 may output the surge control signal SURGE_CTRL.

In some embodiment, referring to FIG. 4 and FIG. 5, after the overvoltage control signal OVP_CTRL is the high level, the first latch 3032 latches the overvoltage control signal OVP_CTRL (the high level). In response to the output signal of the first latch being the first level, the third timer 30331 starts timing. When a timing period of the third timer 30331 exceeds the fourth predetermined time period T4, an output signal of the third timer 30331 is the high level. That is, if the high level output from the first latch 3032 lasts for the fourth predetermined time period T4, the lightning strike timing filter 3033 sets the surge control signal SURGE_CTRL as the high level. Further, when the timing period of the third timer 30331 exceeds the fourth predetermined time period T4, the first latch 3032 is cleared.

Further, the second latch 30332 is coupled with the output terminal of the third timer 30331. If the output signal of the third timer 30331 is the high level, the second latch 30332 latches the output signal of the third timer 30331, and the output terminal of the second latch 30332 outputs the surge control signal SURGE_CTRL (the high level).

Further, the lightning strike timing filter 3033 may further include a fourth timer 30333. An input terminal of the fourth timer 30333 is coupled with the output terminal of the third timer 30331; an output terminal of the fourth timer 30333 is coupled with a second input terminal of the second latch 30332. The output terminal of the second latch 30332 outputs the surge control signal SURGE_CTRL.

In some embodiment, when the output signal of the third timer 30331 is the high level, the fourth timer 30333 starts timing. When a timing period of the fourth timer 30333 exceeds a fifth predetermined time period T5, the second latch 30332 is cleared, and the surge control signal SURGE_CTRL output from the second latch 30332 is set to the low level.

In some embodiment, referring to FIG. 4, the input voltage detection module 30 may further include a reset module 306. The reset module 306 may include a second OR gate OR2 and a fifth timer 3061. Further, the reset module 306 further includes an oscillator 3062, configured to provide a clock signal to the fifth timer 3061. The second OR gate OR2 has a first input terminal coupled with the output terminal of the first voltage comparator 301 and a second input terminal coupled with the output terminal of the second voltage comparator 302, and an output terminal coupled with the fifth timer 3061. An output terminal of the fifth timer 3061 is coupled with the third latch 3051.

In some embodiment, when the voltage of the detected signal BOOVP is lower than the first high voltage threshold VH1 and higher than the first low voltage threshold VL1. When a timing period of the fifth timer 3061 exceeds a sixth predetermined time period T6, the third latch is cleared, so that the detection signal FAULT output from the third latch 3051 is set to the low level.

More specifically, the positive terminal of the first voltage comparator 301 may receive the first high voltage threshold VH1, it may further receive a first regulation threshold VR1. The negative terminal of the second voltage comparator 302 may receive the first low voltage threshold VL1, and further receive a second regulation threshold VR2. Under the premise that the detection signal FAULT is the high level, when the voltage of the detected BOOVP is lower than the first regulation threshold VR1 and duration exceeds the sixth predetermined time period T6, or when the voltage of the detected BOOVP is higher than the second regulation threshold VR2 and duration exceeds the sixth predetermined time period T6, the switch power supply may determine the voltage of the input signal of the switching power supply as a rated voltage, and allow the load circuit to work normally.

The first predetermined time period T1, the second predetermined time period T2, the third predetermined time period T3, and the fourth predetermined time period T4 decrease as the load (not shown) increases; and the first low voltage threshold VL1<the second regulation threshold VR2<the first regulation threshold VR1<the first high voltage threshold VH1.

Figure 6:
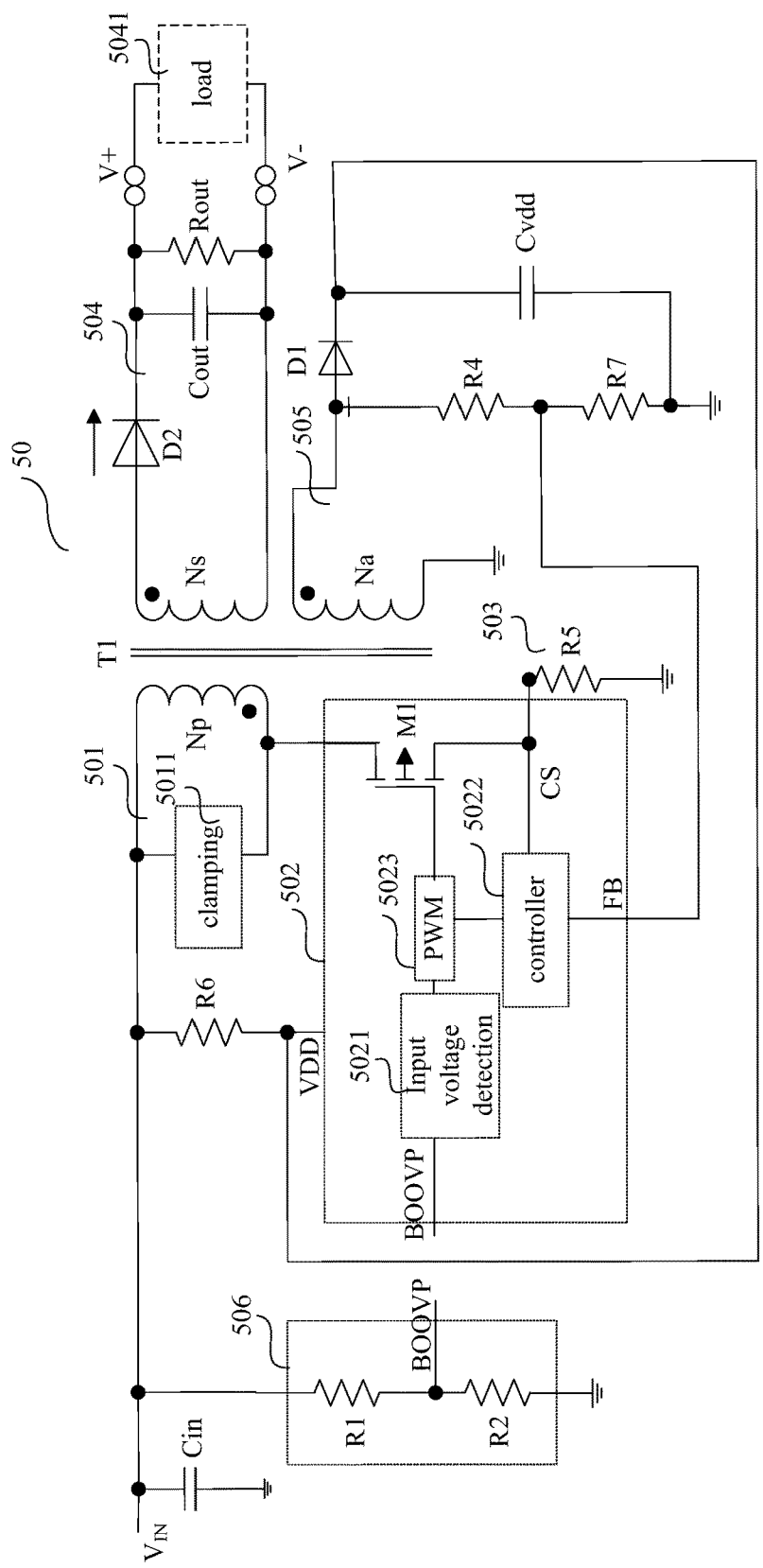
FIG. 6 schematically illustrates a structural diagram of a switching power supply according to an embodiment of the present disclosure.

FIG. 6 schematically illustrates a structural diagram of a switching power supply according to an embodiment of the present disclosure. Referring to FIG. 6, the switching power supply 50 may include a primary winding module 501, a primary controller 502, a primary current sampling loop 503 coupled with the current sampling port CS of the primary controller 502, a DC output stage circuit 504 coupled with the secondary side of the transformer T1, and a power supply and voltage feedback loop 505 of a power supply terminal VDD of the primary controller 502 coupled with an auxiliary winding Na of a transformer T1.

The primary winding module 501 receives an input signal VIN of the switching power supply 50, and one terminal of an input capacitor Cin receives the input signal VIN and the other terminal is grounded. One terminal of a clamping circuit 5011 is coupled with a non-dotted terminal of a primary winding NP of the transformer T1 and receiving the input signal VIN, and the other terminal of a clamping circuit 5011 is coupled with a dotted terminal of the primary winding NP of the transformer T1. In addition, the non-dotted terminal of the primary winding NP further receives the input signal VIN of the switch power supply 50, and the dotted terminal of the primary winding NP is coupled with the input terminal of a power switch transistor M1.

Further, the auxiliary winding Na has a dotted terminal coupled with a positive pole of a diode, and a non-dotted terminal grounded. A negative pole of the diode is coupled with a power supply terminal of the primary controller 502.

Further, the primary controller 502 includes a PWM signal generation module 5023 (illustrated as "PWM"), a controller module 5022 (illustrated as "controller") coupled with the PWM signal generation module 5023, and a power switch transistor M1. The primary current sampling loop 503 includes a resistor R5. The DC output stage circuit 504 includes a secondary winding Ns of the transformer T1, a diode D2 coupled with a dotted terminal of the secondary winding Ns, an output capacitor Cout, a load 5041 and a resistor Rout.

Further, the power supply and voltage feedback loop 505 includes the auxiliary winding Na of a transformer T1. The auxiliary winding Na has a dotted terminal coupled with a feedback voltage division resistor R4 and a positive pole of the diode D2. The power supply and voltage feedback loop 105 further includes a feedback voltage division resistor R7, a starting resistor R6 and a capacitor Cvdd. The starting resistor R6 receives the input signal VIN. The power supply terminal VDD of the primary side controller 502 receives the input signal VIN of the switching power supply 50 via the starting resistor R6.

Figure 1:
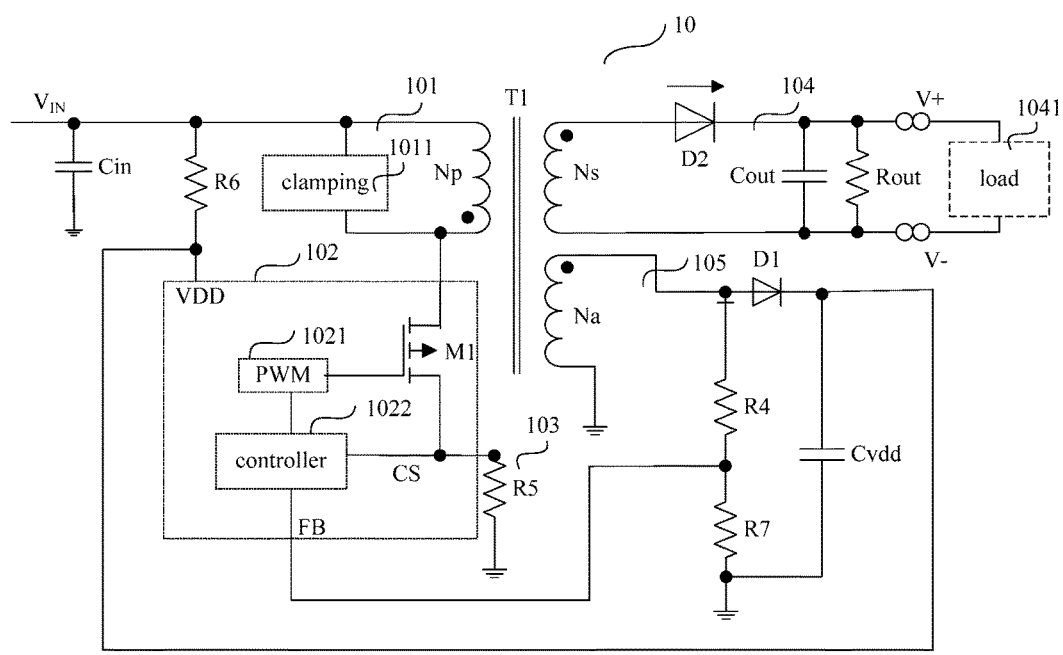
FIG. 1 schematically illustrates a structural diagram of an existing switching power supply.

Compared with the conventional switching power supply 10 (shown in FIG. 1), the switching power supply 50 provided in the embodiment of the present disclosure may further include an input voltage detection module 5021 (that is, the input voltage detection illustrated in the foregoing edge controller 502). Sub-modules of the input voltage detection module 5021 are as described in FIG. 3, FIG. 4 and FIG. 5, and are not described here.

In addition, the switching power supply 50 may also include a voltage division network 506. The voltage division network 506 has an input terminal input with the input signal VIN of the switching power supply 50 and an output terminal output with the detected signal BOOVP.

As shown in FIG. 6, specifically, the voltage division network 506 may include a resistor R1 and a resistor R2. The resistor R1 has a first terminal input with the input signal VIN, and a second terminal outputting the detected signal BOOVP; the resistor R2 has a first terminal coupled with the second terminal of the resistor R1, and a second terminal grounded. At this time, the voltage of the detected signal BOOVP is independent of the operating state of the switching power supply 50, and the voltage of the detected signal BOOVP is shown below, where the voltage of the input signal VIN is a voltage of the input capacitor Cin.

$$V_{BOOVP} = \frac{R2}{R1 + R2} * VIN$$

Figure 7:
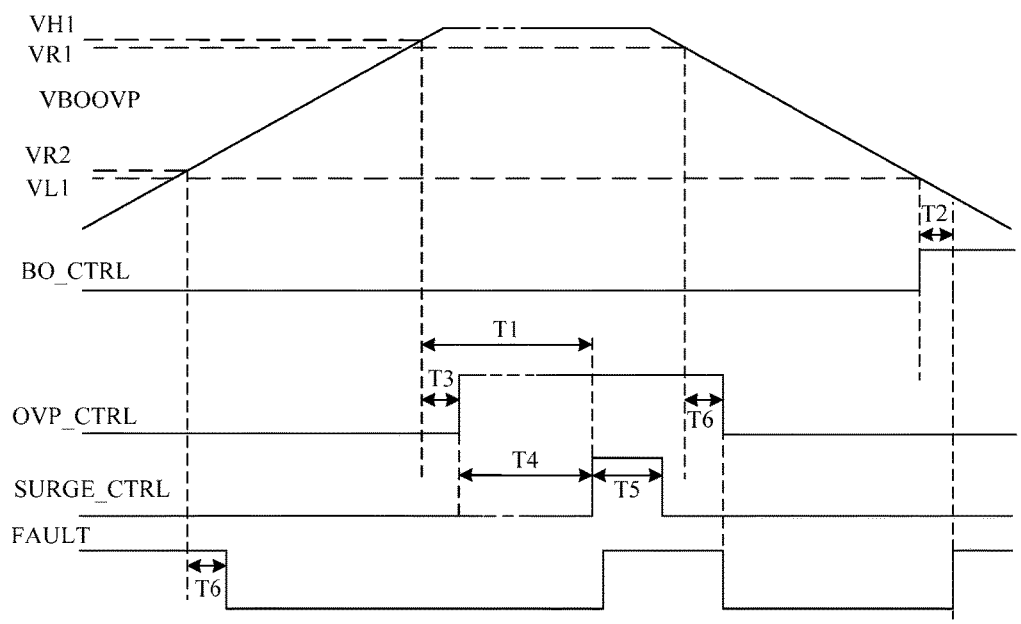
FIG. 7 schematically illustrates a work waveform diagram of the switching power supply shown in FIG. 6.
Figure 8:
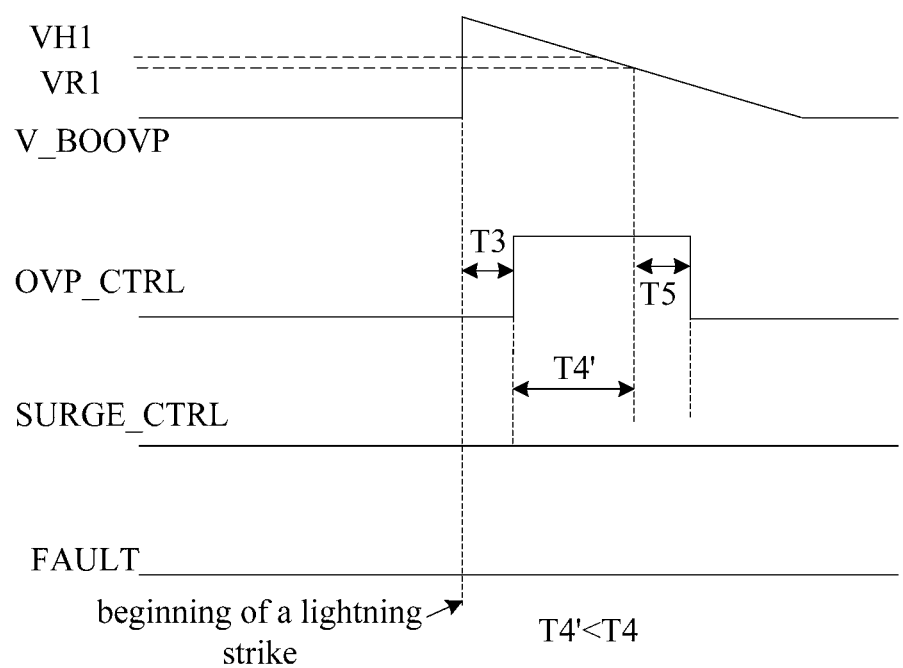
FIG. 8 schematically illustrates a work waveform diagram of the switching power supply under a lightning strike condition shown in FIG. 6.

FIG. 7 schematically illustrates a work waveform diagram of the switching power supply shown in FIG. 6. Referring to FIG. 6 and FIG. 7, when the switching power supply 50 starts, the detection signal FAULT defaults to the high level. As the voltage of the input signal VIN gradually increases, the voltage of the detected signal BOOVP also begins to increase. When the voltage of the detected signal BOOVP is higher than the second regulation threshold VR2 and duration exceeds the fifth predetermine time T5, the detection signal FAULT is set to the low level, allowing the switching power supply 50 to output the PWM signal so that the load 5041 can work normally.

Referring to FIG. 4 to FIG. 7, When the voltage of the detected signal BOOVP is greater than the first high voltage threshold VH1 and duration exceeds the third predetermined time period T3, the overvoltage control signal OVP_CTRL is set to the high level. The third timer in the lightning strike timing filter 3033 (illustrated as LSTF) starts timing. If the timing period of the third timer 30331 exceeds the fourth predetermined time period T4, the surge control signal SURGE_CTRL is set to the high level. At this time, both of the control signal OVP_CTRL and the surge control signal SURGE_CTRL are the high level, which means that the voltage of the detected signal BOOVP is higher than the first high voltage threshold VH1 and duration exceeds the third predetermined time period T3. Therefore, the logic circuit 306 outputs the high level. That is, the switching power supply 50 determines that the voltage of the input signal VIN is at an input overvoltage, so that the detection signal FAULT is the high level, and the PWM signal generation module 5023 stops generating the PWM signal. The second predetermined time period T2, the third predetermined time period T3 and the fourth predetermined time period T4 decrease as the load 5041 increases.

It should be noted that, when the fourth timer 30333 in the lightning strike timing filter 3033 starts timing and the timing period exceeds the fifth preset time T5, the second latch 3032 is cleared, and the fifth preset time T5 continues. Duration of the fifth predetermined time period T5 is greater than a period of a mains supply. In the chip design step, the fourth predetermined time period T4 needs to be designed to be greater than a hold time of an input capacitor voltage overshoot caused by a lightning strike. Therefore, if the timing period of the third timer 30331 exceeds the fourth predetermined time period T4, the input signal is deemed to be a non-lightning signal and the PWM signal generation module 5023 stops outputting the PWM signal. Otherwise, the input signal is a lightning signal, and the PWM signal generation module 5023 continues to output the PWM signal.

When the voltage of the detected signal BOOVP is higher than the first regulation threshold VR1 and duration exceeds the sixth predetermined time period T6, the overvoltage control signal OVP_CTRL is set to the low level, and the detection signal FAULT is set to the low level at the same time, so that the PWM signal generation module 5023 outputs the PWM signal.

When the voltage of the detected signal BOOVP continues to decrease and is lower than the first low voltage threshold VL1 and duration exceeds the second preset time T2, the undervoltage control signal BO CTRL signal is set to the high level, and the detection signal FAULT is set to the high level at the same time, so that the PWM signal generation module 5023 stops outputting the PWM signal.

At this time, an input undervoltage threshold $V_{BO}$ is shown below.

$$V_{BO} = \frac{R2 + R1}{R2} * VR1$$

Referring to FIG. 4, FIG. 5, FIG. 6 and FIG. 8, a lightning strike state occurs when the switching power supply 50 works normally. Under a lightning strike state, a voltage of the input capacitor Cin rises instantaneously, and then gradually decreases to a normal value. During this period, the voltage of the detected signal BOOVP rapidly increases and exceeds the first high voltage threshold VH1, and the first timer 3031 in the first timing module 303 starts timing. When the timing period of the first timer exceeds the third predetermined time period T3, the switching power supply 50 sets the overvoltage control signal OVP_CTRL to the high level. At this time, the third timer 30331 in the lightning strike timing filter 3033 starts timing. Because the capability of the lightning strike state cannot continue, the voltage of the input capacitor Cin is gradually reduced. Before the fourth predetermined time period T4 is reached, the voltage of the input capacitor Cin is reduced to a normal value (for example, in FIG. 8, a voltage, less than the first regulation threshold). In this period, a timing period of the third timer 30331 is T4'. After the voltage of the detected signal BOOVP is lower than the first regulation threshold VR1 and duration exceeds the fifth predetermined time period T5, the switching power supply 50 sets the overvoltage control signal OVP_CTRL to the low level.

Since the fourth predetermined time period T4 set inside the switching power supply 50 is greater than the time period T4', the surge control signal SURGE_CTRL keeps the low level during the lightning strike state, that is the output signal of the logic circuit 305 is the low level. The overshoot of the input capacitor voltage caused by the lightning stroke is not judged by the switching power supply 50 as an overvoltage of the input voltage, so that under the lightning strike state, the detection signal FAULT is still the low level, so that the PWM signal generation module 5023 continuously outputs the PWM signal, and the load 5041 can normal work. Those skilled in the art understand that the fourth preset time T4 may also be called a lightning strike shield time T4.

At this time, an input overvoltage threshold $V_{VOP}$ of the switching power supply 50 is shown below.

$$V_{OVP} = \frac{R1 + R2}{R2} * VH1$$

Figure 9:
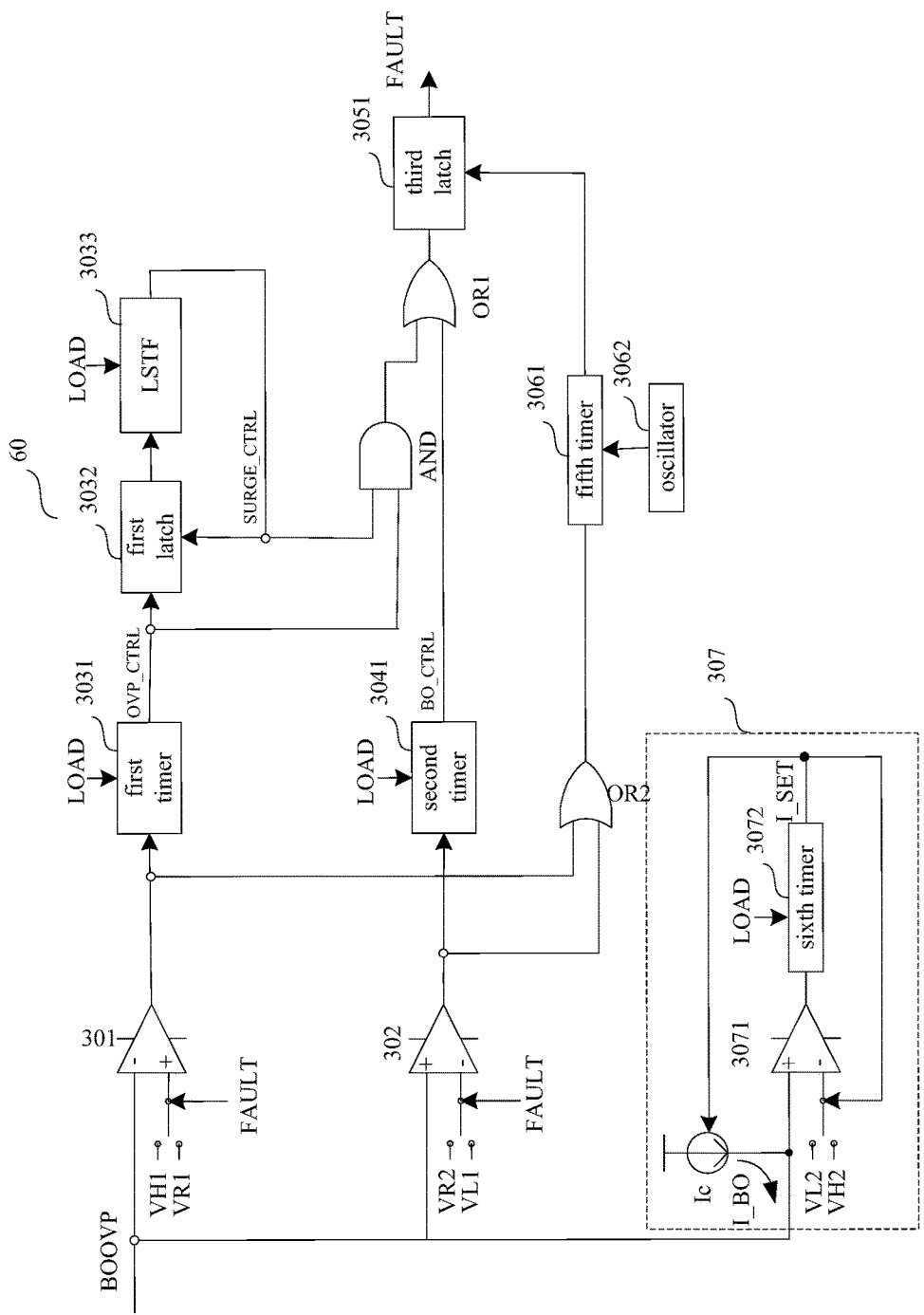
FIG. 9 schematically illustrates a structural diagram of an input voltage detection module in the primary controller shown in FIG. 2 according to an embodiment of the present disclosure.

FIG. 9 schematically illustrates a structural diagram of an input voltage detection module in the primary controller shown in FIG. 2. In some embodiment, compared with the input voltage detection module 30 shown in FIG. 4, an input voltage detection module 60 shown in FIG. 9 further includes an overvoltage adjustment module 307. The overvoltage adjustment module 307 may charge an input terminal of the input voltage detection module 60 when the voltage of the detected signal BOOVP is higher than the second high voltage threshold VH2.

The second high voltage threshold VH2 is lower than the first regulation threshold VR1. The first regulation threshold VR1 is lower than the first high voltage threshold VH1. The second high voltage threshold VH2 is higher than the second regulation threshold VR2. The second regulation threshold VR2 is higher than the first low voltage threshold VR1.

In some embodiment, the overvoltage adjustment module 307 may include a third voltage comparator 3071, a sixth timer 3072 and a current mirror Ic.

A positive terminal of the third voltage comparator 3071 is coupled with the input port of the detected signal BOOVP and an output terminal of the current mirror Ic; an negative terminal of the third voltage comparator 3071 may receive the second high voltage threshold VH2 and the second low voltage threshold VL2; an output of the third voltage comparator 3071 is coupled with a first input terminal of the sixth timer 3072, and a second input terminal of the sixth timer 3072 receives a clock signal LOAD output by an external load (not shown). An output terminal of the sixth timer 3072 is coupled with an input terminal of the current mirror Ic and the negative terminal of the third voltage comparator 3071 respectively.

Further, when the switching power supply starts, the voltage of the detected signal BOOVP is relatively low. If the voltage of the detected signal BOOVP is lower than the second high voltage threshold VH2, the third voltage comparator 3071 outputs the low level, and at this time, the current mirror Ic is in an off state.

In some embodiment, the third voltage comparator 3071 may compare the voltage of the detected signal BOOVP with the second high voltage threshold VH2, and output the high level when the voltage of the detected signal BOOVP is higher than the second high voltage threshold VH2. At this time, the sixth timer 3072 starts timing. When a timing period exceeds a seventh preset time T7, a current start signal I_SET is output. The current start signal I_SET may be set to the high level, otherwise it is set to be the low level. When the current start signal I_SET is the high level, the current mirror Ic is opened, and the current mirror Ic outputs a stable current I_BO to the input port of the detected signal BOOVP. At the same time, the third voltage comparator 3071 compares the second low voltage threshold VL2 and the voltage of the detected signal BOOVP. If the voltage of the detected signal BOOVP is higher than the second low voltage threshold VL2, the high level is output, so that the current mirror Ic can continue to output the stable current I_BO when the switching power supply works.

Those skilled in the art understand that the negative terminal of the third voltage comparator 3071 is coupled with the input port of the detected signal BOOVP, the output terminal of the current mirror Ic. The positive terminal of the third voltage comparator 3071 receives the second high voltage threshold VH2 and the second low voltage threshold VL2, at this time, the current mirror is opened when the current start signal I_SET is the low level to charge the input terminal of the input voltage detection module 60.

Figure 10:
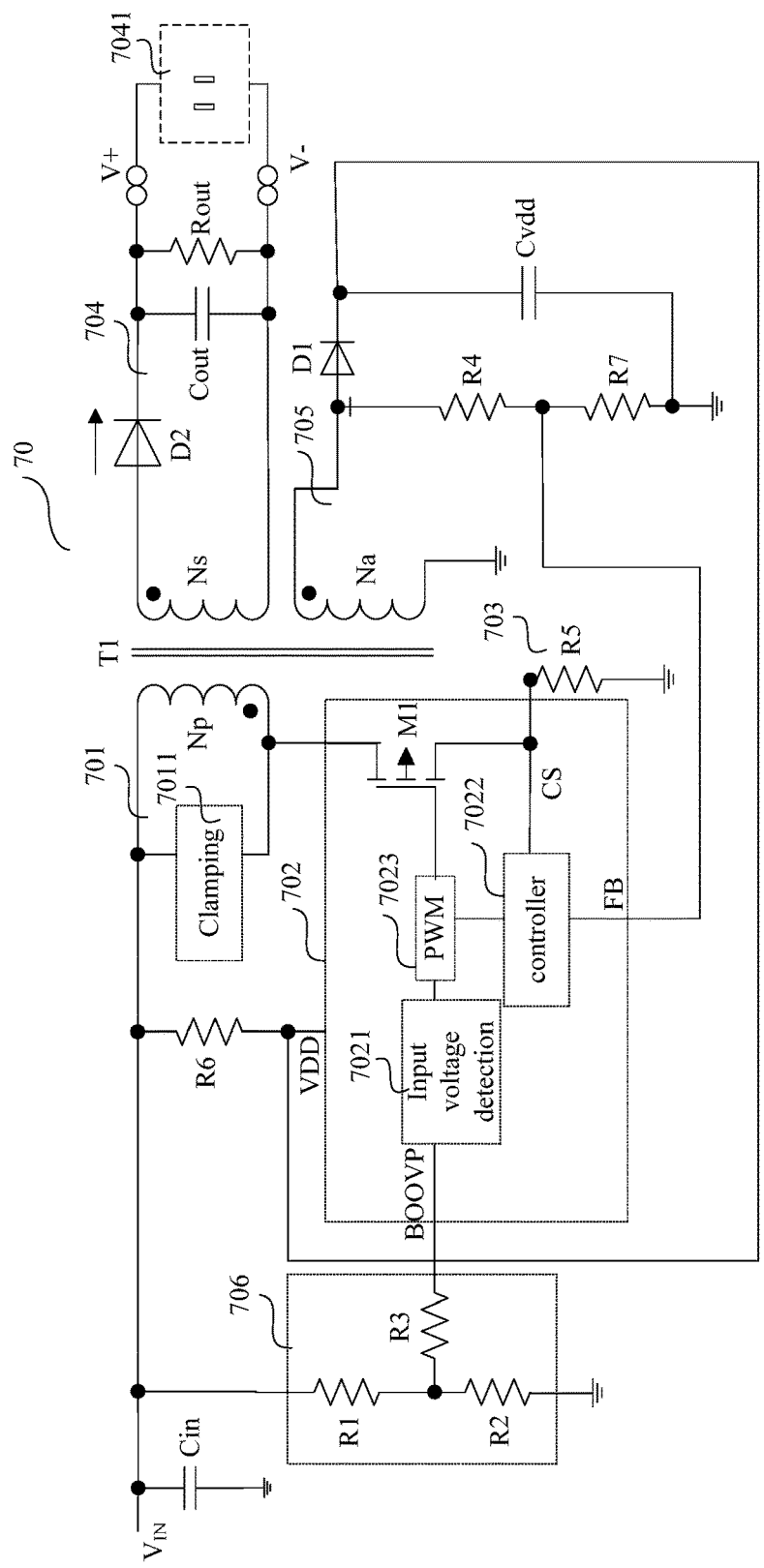
FIG. 10 schematically illustrates a structural diagram of a switching power supply according to an embodiment of the present disclosure.
Figure 11:
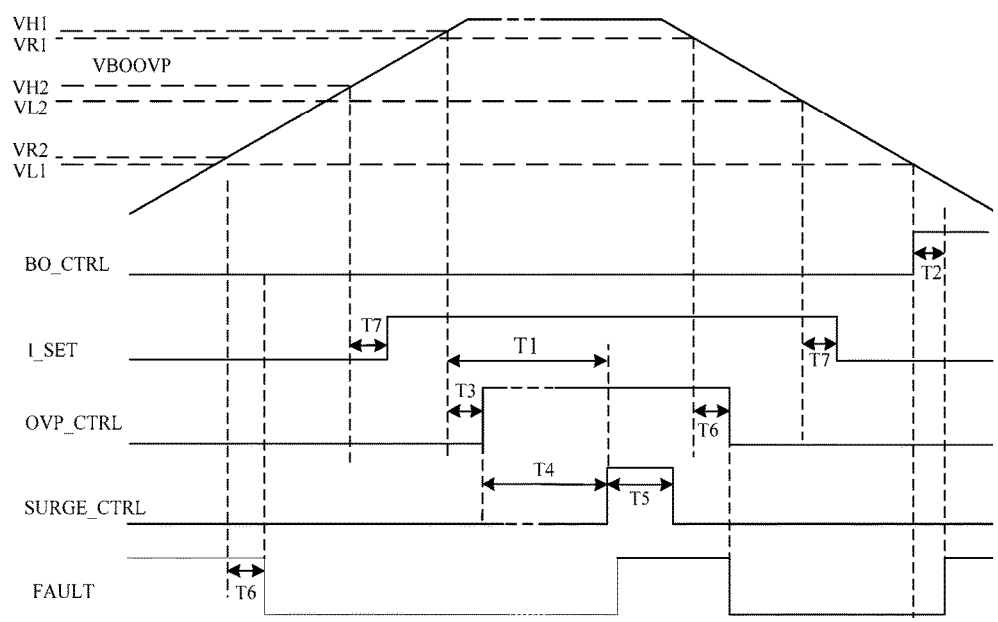
FIG. 11 schematically illustrates a work waveform diagram of the switching power supply shown in FIG. 10.

FIG. 10 schematically illustrates a structural diagram of a switching power supply according to an embodiment of the present disclosure. A primary controller 702 of a switching power supply 70 includes the input voltage detection module 60 shown in FIG. 9. Referring to FIG. 5, FIG. 6, FIG. 9 and FIG. 10, the difference between the primary controller 502 in FIG. 6 and the primary controller 702 in FIG. 10 is the difference between the input voltage detection module 5021 in FIG. 6 and the input voltage detection module 7021 in FIG. 10. In the switching power supply 70, the input voltage detection module 7021 in FIG. 10 further includes an overvoltage adjustment module 307.

Further, the switching power supply 70 shown in FIG. 10 also includes a voltage dividing network 706, an input terminal of the voltage dividing network 706 receives an input signal VIN of the switching power supply 70, and an output terminal of the voltage dividing network 706 outputs the detected signal BOOVP. Compared FIG. 6 with FIG. 10, it can be found that the voltage division network 706 may include a resistor R1, a resistor R2 and a resistor R3, and has one more resistance R3 than the voltage divider network 506 shown in FIG. 6. Combining the overvoltage adjustment module 307 (as shown in FIG. 9) and the resistor R3, when the current mirror Ic outputs the stable current I_BO to the input port of the detected signal BOOVP, the voltage of the detected signal BOOVP is shown below.

$$V_{BOOVP} = \frac{R2}{R1+R2} * VIN + I\_BO * \left(\frac{R1*R2}{R1+R2} + R3\right)$$

VIN is a voltage of the input capacity CIN.

Specifically, the resistor R1 has a first terminal input with the input signal VIN, and a second terminal coupled with a first terminal of the resistor R2. The resistor R2 has the first terminal coupled with the second terminal of the resistor R1, and a second terminal grounded. The resistor R3 has a first terminal coupled with the second terminal of the resistor R1 and the first terminal of the resistor R2, and a second terminal outputting the detected signal BOOVP.

For more information about operating principles and working modes of other modules of the switching power supply 70, reference may be made to the related description of the embodiment of the above-described switching power supply embodiment shown in FIG. 6 and the embodiment of the input voltage detection module shown in FIG. 9, which is not described here.

Referring to FIG. 3 to FIG. 5 and FIG. 9 to FIG. 11, FIG. 11 illustrates a changing trend of a work waveform of the input signal VIN of the switching power supply 70 from undervoltage to overvoltage. When the switching power supply 70 starts, the detection signal FAULT defaults to be the high level.

As the voltage of the input signal VIN gradually increases, the voltage of the detected signal BOOVP increases, and when the voltage of the detected signal BOOVP is higher than the second regulation threshold VR2 and duration exceeds the sixth predetermined time period T6, the detection signal FAULT is set to the low level, and the switching power supply 70 outputs the PWM signal through the PWM signal generation module 7023.

When the voltage of the detected signal BOOVP is higher than the second high voltage threshold VH2 and duration exceeds the seventh predetermined time period T7, the current start signal I_SET is set to the high level and the current mirror Ic is opened, and the current mirror Ic outputs the stable current I_BO to the detected signal BOOVP.

At this time, the voltage of the detected signal BOOVP is shown below where VIN is the voltage of the input capacitor Cin.

$$V_{BOOVP} = \frac{R2}{R1+R2} * VIN + I\_BO * \left(\frac{R1*R2}{R1+R2} + R3\right)$$

When the current start signal I_SET output from the sixth timer 3072 is the low level, the third voltage comparator 3071 compares the voltage of the detected signal BOOVP with the second high voltage threshold VH2. When the voltage of the detected signal BOOVP is higher than the second high voltage threshold VH2, the third voltage comparator 3071 outputs the high level. The sixth timer 3072 sets the output current start signal I_SET to the high level. When the current start signal I_SET is the high level, the third voltage comparator 3071 compares the voltage of the detected signal BOOVP with the second low voltage threshold VL2, and the current start signal I_SET is maintained at the high level.

When the voltage of the detected signal BOOVP is higher than the first high voltage threshold VH1 and duration exceeds the third predetermined time period T3, the overvoltage control signal OVP_CTRL is set to the high level. After that, the third timer 30331 in the lightning strike timing filter 3033 starts timing. If the timing period exceeds the fourth predetermined time period T4, the surge control signal SURGE_CTRL is set to the high level, which is kept and duration exceeds the fifth predetermined time period T5. During the predetermined time period T5, the overvoltage control signal OVP_CTRL is the high level, that is, the voltage of the detected signal BOOVP is higher than the first high voltage threshold VH1 and duration exceeds the third predetermined time period T3. Therefore, the switching power supply determines the input voltage is at an overvoltage, and the PWM signal generation module stops outputting the PWM signal. During the design of the switching power supply, the fourth predetermined time period T4 should be greater than the voltage overshoot holding time of the input capacitor caused by the lightning strike, and the fifth predetermined time period T5 is greater than a period of the mains supply.

When the voltage of the detected signal BOOVP is higher than the first high voltage threshold VH1, the input voltage is determined at overvoltage.

When the voltage of the detected signal BOVPP is lower than the first regulation threshold VR1 and duration exceeds the sixth predetermined time period T6, the overvoltage control signal OVP_CTRL signal is set to the low level and the detection signal FAULT is set to the low level, and the switching power supply 70 allows the PWM signal generation module 5023 to output the PWM signal. At this time, the input overvoltage threshold of the switching power supply is shown below.

$$V_{OVP} = \frac{R1 + R2}{R2} * \left( VH1 - I\_BO * \left( \frac{R1 * R2}{R1 + R2} + R3 \right) \right)$$

When the voltage of the detected signal BOOVP is lower than the second low voltage threshold VL2 and duration exceeds the seventh predetermined time period T7, the third voltage comparator outputs the current start signal I_SET (the low level) and the current mirror Ic is turned off. At this time, the voltage of the detected signal BOOVP is shown below.

$$\frac{R2}{R1 + R2} * VIN$$

When the voltage of the detected signal BOOVP is lower than the first low voltage threshold VL1 and duration exceeds the second predetermined time period T2, the undervoltage control signal BO CTRL signal is set to the high level, and the detection signal FAULT is set to the high level at the same time. The PWM signal generation module stops outputting the PWM signal. At this time, the input power supply undervoltage threshold $V_{BO}$ is shown below.

$$V_{BO} = \frac{R2 + R1}{R2} * VL1$$

Those skilled in the art understand that the input undervoltage threshold may be adjusted by setting the resistor R1 and the resistor R2, and the input overvoltage threshold has a fine tuning by adjusting the resistor R3.

Figure 12:
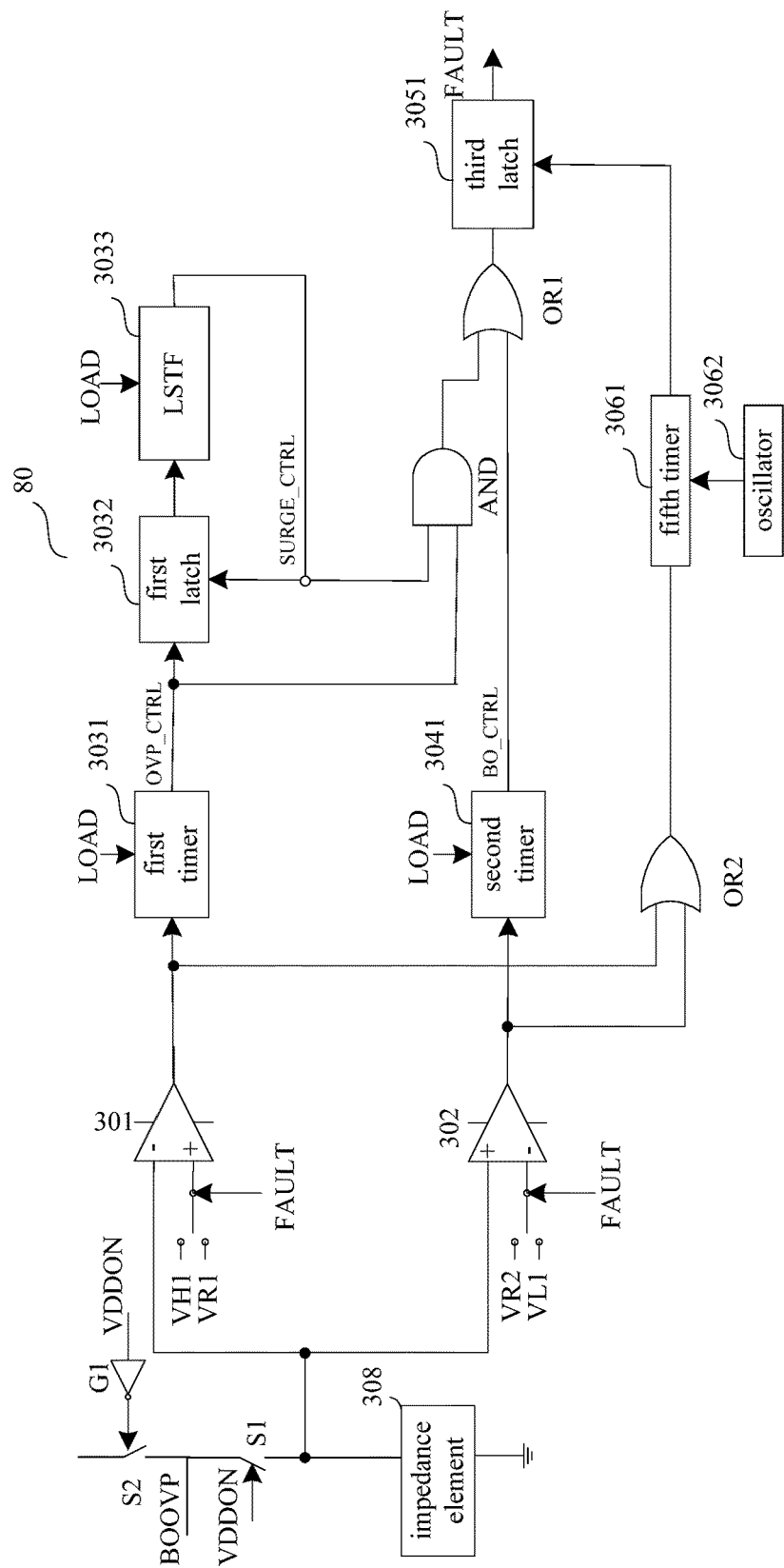
FIG. 12 schematically illustrates a structural diagram of an input voltage detection module shown in FIG according to an embodiment of the present disclosure. 2.

FIG. 12 schematically illustrates a structural diagram of an input voltage detection module shown in FIG. 2. Compared with the input voltage detection module 30 shown in FIG. 4, the input voltage detection module 80 shown in FIG. 12 includes, in addition to all sub-modules of the input voltage detection module 30 shown in FIG. 4, a first switch S1 and an impedance element 308. Further, the input voltage detection module 80 includes a second switch S2 and an inverter G1. The inverter G1 receives an inverted signal of a power control signal VDDON to control the first switch S1 to be closed or opened. A voltage of the power control signal VDDON increases as the input signal VIN of the switching power supply increases.

The impedance element 308 has one end coupled with a second terminal of the first switch S1, and the other terminal grounded. The impedance element may be one of a resistor, a current mirror and a voltage follower.

The second switch S2 has a first terminal of the second switch S2 coupled with the power terminal VDD port of the primary controller 902, and the second terminal coupled with the input terminal of the primary controller, and a control terminal input with an inverted signal of the power control signal VDDON, so that the first switch S1 and the second switch S2 are in different switching states.

Figure 13:
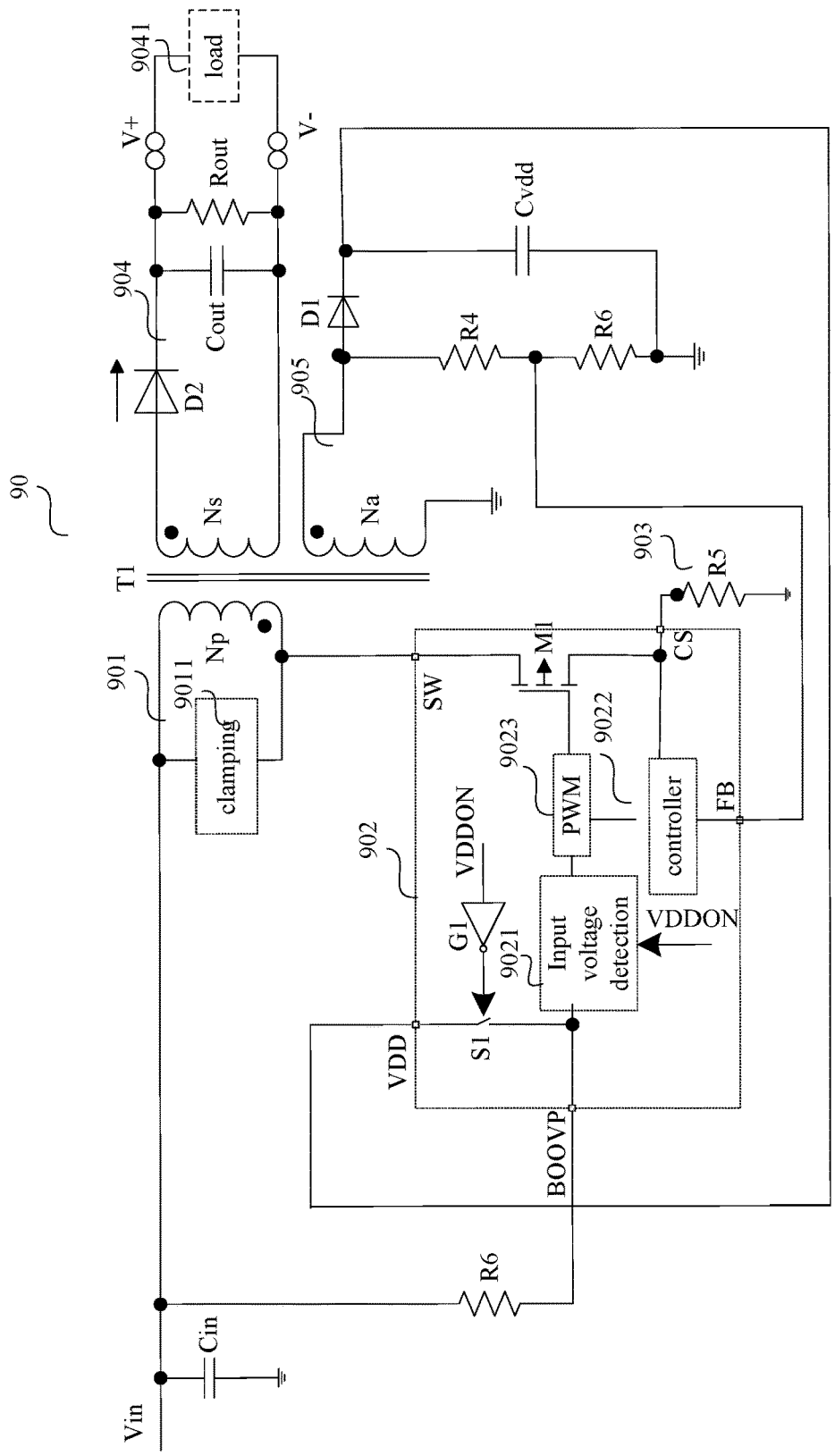
FIG. 13 schematically illustrates a structural diagram of a switching power supply according to an embodiment of the present disclosure.

FIG. 13 schematically illustrates a structural diagram of a switching power supply according to an embodiment of the present disclosure. Compared with the switching power supply shown in FIG. 6 or FIG. 10, the switching power supply 90 can realize the function of detecting the input voltage in combination with the primary-side controller 902 without an additional voltage division network. The input voltage detection module 9021 in the primary side controller 902 is the input voltage detection module 80 shown in FIG. 12.

Specifically, the input voltage detection module 80 includes the impedance element 308. When the starting resistor R6 is coupled with the input port of the detected signal BOOVP and is coupled with the power terminal VDD of the primary controller 902 through the second switch S2, the switching power supply circuit 90 can be started.

Further, a combination of the starting resistor R6 and the impedance element 308 may realize a function of input voltage detection. The switching power supply 90 may adjust the input overvoltage threshold and the input undervoltage threshold through a fine tuning of the starting resistor R6.

Specifically, when the voltage of the power supply terminal VDD of the primary side controller 902 is lower than the starting voltage of the switching power supply, the power control signal VDDON is the low level, and the high level is output through the inverter G1 to control the conduction of the second switch S2 (The first switch S1 is opened). The starting resistor R6 is coupled with the power supply terminal VDD through the second switch S2. The primary controller 902 is charged through the starting resistor R6, and the voltage of the power supply terminal VDD slowly rises. When the voltage of the power supply terminal VDD is higher than the startup voltage, the power control signal VDDON is the high level, and a low level signal is output through the inverter G1, causing the second switch S2 to be opened and the first switch S1 to be closed. The starting resistor R6 is coupled with the impedance element 308, the negative terminal of the first voltage comparator 301, and the positive terminal of the second voltage comparator through the first switch S1. The starting resistor R6 and the impedance element 308 constitute a first voltage division circuit and can be configured to detect the input voltage. When the second switch S2 is opened and the first switch S1 is closed, the voltage of the detected signal BOOVP is shown below, where VIN is the voltage of the input capacitor Cin.

$$V_{BOOVP} = \frac{R2}{R6 + R2} * VIN$$

Through the first switch S1 and the second switch S2, the starting resistor R6 of the switching power supply 90 may be implemented as a resistor (for example, the resistor R1 shown in FIG. 6 or FIG. 10) in the voltage division network to realize a reuse of the starting resistor and the feedback voltage division resistor. It can be seen that a structure of the switching power supply 90 can simplify the switching power supply and reduce the system cost.

With reference to FIG. 12 and FIG. 13, those skilled in the art understand that adjustment of the input undervoltage threshold and the input overvoltage threshold can be realized by setting the starting resistor R6 and the impedance element 308.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

The invention claimed is:

1. A primary controller of a switching power supply, comprising:
   an input voltage detection module, having an input terminal input with a detected signal, wherein the input voltage detection module is configured to detect a voltage of the detected signal and generate a detection signal, and the detection signal is a first level when a voltage of the detected signal is higher than a first high voltage threshold and a duration exceeds a first predetermined time period, or when the voltage of the detected signal is lower than a first low voltage threshold and the duration exceeds a second predetermined time period, otherwise, the detection signal is a second level, wherein the detected signal is obtained according to an input signal of the switching power supply, and the first low voltage threshold is lower than the first high voltage threshold, and the second level is different from the first level;
   a controller module, configured to receive a feedback signal and a current sampling signal of the switching power supply, and generate a control signal according to the feedback signal and the current sampling signal;
   a pulse width modulation (PWM) signal generation module, configured to receive the detection signal and the control signal, generate a PWM signal according to the control signal when the detection signal is the second level, and stop generating the PWM signal when the detection signal is the first level; and
   a power switch transistor, having a control terminal coupled with an output terminal of the PWM signal generation module;
   wherein the input voltage detection module comprises:
      a first voltage comparator, configured to compare the voltage of the detected signal with the first high voltage threshold;
      a first timing module, configured to start timing when the first voltage comparator detects that the voltage of the detected signal is higher than the first high voltage threshold;
      a second voltage comparator, configured to compare the voltage of the detected signal with the first low voltage threshold;
      a second timing module, configured to start timing when the second voltage comparator detects that the voltage of the detected signal is lower than the first low voltage threshold; and
      a logic circuit, configured to obtain the detection signal according to output signals of the first timing module and the second timing module;
   wherein the first timing module comprises:
      a first timer, having an input terminal coupled with an output terminal of the first voltage comparator, wherein an overvoltage control signal output from the first timer is the first level when a timing period of the first timer exceeds a third predetermined time period;
      a first latch, configured to receive and latch the overvoltage control signal in response to the overvoltage control signal being the first level; and
      a lightning strike timing filter, configured to start timing in response to an output signal of the first latch being the first level, wherein a surge control signal output from the lightning strike timing filter is the first level when a timing period of the lightning strike timing filter exceeds a fourth predetermined time period, wherein a sum of the third predetermined time period and the fourth predetermined time period is equal to the first predetermined time period.

2. The primary controller according to claim 1, wherein the second timing module comprises:
   a second timer, having an input terminal coupled with an output terminal of the second voltage comparator, and configured to start timing in response to an output signal of the second voltage comparator being the first level, wherein an undervoltage control signal output from the second timer is the first level when a timing period of the second timer exceeds the second predetermined time period.

3. The primary controller according to claim 1, wherein the input voltage detection module further comprises:
   an overvoltage adjustment module, configured to charge the input terminal of the input voltage detection module when the voltage of the detected signal is higher than a second high voltage threshold;
   wherein the second high voltage threshold is lower than the first high voltage threshold and higher than the first low voltage threshold.

4. The primary controller according to claim 3, wherein the overvoltage adjustment module comprises:
   a third voltage comparator, configured to compare the voltage of the detected signal with the second high voltage threshold;
   a sixth timer, coupled with an output terminal of the third voltage comparator, and configured to start timing in response to the voltage of the detected signal being higher than the second high voltage threshold, wherein when a timing period of the sixth timer exceeds a seventh predetermined time period, a current start signal is output; and
   a current source, configured to charge the input terminal of the input voltage detection module in response to the current start signal.

5. A switching power supply comprising:
   a primary controller that includes:
      an input voltage detection module, having an input terminal input with a detected signal, wherein the input voltage detection module is configured to detect a voltage of the detected signal and generate a detection signal, and the detection signal is a first level when a voltage of the detected signal is higher than a first high voltage threshold and a duration exceeds a first predetermined time period, or when the voltage of the detected signal is lower than a first low voltage threshold and the duration exceeds a second predetermined time period, otherwise, the detection signal is a second level, wherein the detected signal is obtained according to an input signal of the switching power supply, and the first low voltage threshold is lower than the first high voltage threshold, and the second level is different from the first level;

a controller module, configured to receive a feedback signal and a current sampling signal of the switching power supply, and generate a control signal according to the feedback signal and the current sampling signal;

a pulse width modulation (PWM) signal generation module, configured to receive the detection signal and the control signal, generate a PWM signal according to the control signal when the detection signal is the second level, and stop generating the PWM signal when the detection signal is the first level; and a power switch transistor, having a control terminal coupled with an output terminal of the PWM signal generation module;

a primary winding, having a non-dotted terminal input with the input signal of the switching power supply, and a dotted terminal coupled with an input terminal of the power switch transistor;

an auxiliary winding, having a dotted terminal coupled with a positive pole of a diode, and a non-dotted terminal grounded, wherein a negative pole of the diode is coupled with a power supply terminal of the primary controller which receives the input signal of the switching power supply through a starting resistor; and a voltage division network, having an input terminal input with the input signal of the switching power supply and an output terminal outputting the detected signal.

6. A switching power supply comprising:
a primary controller that includes:
an input voltage detection module, having an input terminal input with a detected signal, wherein the input voltage detection module is configured to detect a voltage of the detected signal and generate a detection signal, and the detection signal is a first level when a voltage of the detected signal is higher than a first high voltage threshold and a duration exceeds a first predetermined time period, or when the voltage of the detected signal is lower than a first low voltage threshold and the duration exceeds a second predetermined time period, otherwise, the detection signal is a second level, wherein the detected signal is obtained according to an input signal of the switching power supply, and the first low voltage threshold is lower than the first high voltage threshold, and the second level is different from the first level;

a controller module, configured to receive a feedback signal and a current sampling signal of the switching power supply, and generate a control signal according to the feedback signal and the current sampling signal;

a pulse width modulation (PWM) signal generation module, configured to receive the detection signal and the control signal, generate a PWM signal according to the control signal when the detection signal is the second level, and stop generating the PWM signal when the detection signal is the first level; and a power switch transistor, having a control terminal coupled with an output terminal of the PWM signal generation module;

a primary winding, having a non-dotted terminal input with the input signal of the switching power supply, and a dotted terminal coupled with an input terminal of the power switch transistor;

an auxiliary winding, having a dotted terminal coupled with a positive pole of a diode, and a non-dotted terminal ground, wherein a negative pole of the diode is coupled with a power supply terminal of the primary controller; and a feedback voltage division resistor, having a terminal input with the input signal, and the other terminal coupled with an input terminal of the primary controller;

wherein the primary controller receives the input signal, and the primary controller further comprises:
a first switch, having a first terminal coupled with the input terminal of the primary controller and a control terminal input with a power supply control signal, wherein a voltage of the power supply control signal increases as the input signal of the switching power supply increases;

an impedance element, having a terminal coupled with a second terminal of the first switch and outputting the detected signal, and the other terminal grounded; and a second switch, having a first terminal coupled with the power supply terminal of the primary controller, a second terminal coupled with the input terminal of the primary controller and a control terminal input with an inverting signal of the power supply control signal.

7. A primary controller of a switching power supply, comprising:
an input voltage detection module, having an input terminal input with a detected signal, wherein the input voltage detection module is configured to detect a voltage of the detected signal and generate a detection signal, and the detection signal is a first level when a voltage of the detected signal is higher than a first high voltage threshold and a duration exceeds a first predetermined time period, or when the voltage of the detected signal is lower than a first low voltage threshold and the duration exceeds a second predetermined time period, otherwise, the detection signal is a second level, wherein the detected signal is obtained according to an input signal of the switching power supply, and the first low voltage threshold is lower than the first high voltage threshold, and the second level is different from the first level;

a controller module, configured to receive a feedback signal and a current sampling signal of the switching power supply, and generate a control signal according to the feedback signal and the current sampling signal;

a pulse width modulation (PWM) signal generation module, configured to receive the detection signal and the control signal, generate a PWM signal according to the control signal when the detection signal is the second level, and stop generating the PWM signal when the detection signal is the first level; and a power switch transistor, having a control terminal coupled with an output terminal of the PWM signal generation module;

wherein the input voltage detection module comprises:
- a first voltage comparator, configured to compare the voltage of the detected signal with the first high voltage threshold;
- a first timing module, configured to start timing when the first voltage comparator detects that the voltage of the detected signal is higher than the first high voltage threshold;
- a second voltage comparator, configured to compare the voltage of the detected signal with the first low voltage threshold;
- a second timing module, configured to start timing when the second voltage comparator detects that the voltage of the detected signal is lower than the first low voltage threshold; and
- a logic circuit, configured to obtain the detection signal according to output signals of the first timing module and the second timing module;

wherein the first timing module comprises:
- a first timer, having an input terminal coupled with an output terminal of the first voltage comparator, wherein an overvoltage control signal output from the first timer is the first level when a timing period of the first timer exceeds a third predetermined time period;
- a first latch, configured to receive and latch the overvoltage control signal in response to the overvoltage control signal being the first level; and
- a lightning strike timing filter, configured to start timing in response to an output signal of the first latch being the first level, wherein a surge control signal output from the lightning strike timing filter is the first level when a timing period of the lightning strike timing filter exceeds a fourth predetermined time period, wherein a sum of the third predetermined time period and the fourth predetermined time period is equal to the first predetermined time period;

wherein the lightning strike timing filter comprises:
- a third timer, configured to start timing in response to the output signal of the first latch being the first level, wherein an output signal of the third timer is the first level when a timing period of the third timer exceeds the fourth predetermined time period;
- a second latch, coupled with an output terminal of the third timer, and configured to latch the output signal of the third timer in response to the output signal of the third timer being the first level, wherein an output terminal of the second latch outputs the surge control signal; and
- a fourth timer, coupled with the output terminal of the third timer, wherein the fourth timer starts timing when the output signal of the third timer is the first level, and the second latch is reset when a timing period of the fourth timer exceeds a fifth predetermined time period.

8. The primary controller according to claim 7, wherein the second timing module comprises:
- a second timer, having an input terminal coupled with an output terminal of the second voltage comparator, and configured to start timing in response to an output signal of the second voltage comparator being the first level, wherein an undervoltage control signal output from the second timer is the first level when a timing period of the second timer exceeds the second predetermined time period.

9. The primary controller according to claim 7, wherein the input voltage detection module further comprises:
- an overvoltage adjustment module, configured to charge the input terminal of the input voltage detection module when the voltage of the detected signal is higher than a second high voltage threshold;
- wherein the second high voltage threshold is lower than the first high voltage threshold and higher than the first low voltage threshold.

10. The primary controller according to claim 9, wherein the overvoltage adjustment module comprises:
- a third voltage comparator, configured to compare the voltage of the detected signal with the second high voltage threshold;
- a sixth timer, coupled with an output terminal of the third voltage comparator, and configured to start timing in response to the voltage of the detected signal being higher than the second high voltage threshold, wherein when a timing period of the sixth timer exceeds a seventh predetermined time period, a current start signal is output; and
- a current source, configured to charge the input terminal of the input voltage detection module in response to the current start signal.

* * * * *